July 1, 1952  H. V. CRAWFORD ET AL  2,602,125

LIQUID RHEOSTAT

Filed Dec. 31, 1949

Inventors:
Henry V. Crawford,
Leland J. Parkinson,
by *Claude A. Mott*
Their Attorney.

Patented July 1, 1952

2,602,125

UNITED STATES PATENT OFFICE 2,602,125

LIQUID RHEOSTAT

Henry V. Crawford and Leland J. Parkinson, Schenectady, N. Y., assignors to General Electric Company, a corporation of New York Application December 31, 1949, Serial No. 136,226

9 Claims. (Cl. 201—57)

This invention relates to liquid rheostats, and has for its principal object the provision of new and improved rheostats of this type.

A further object of the invention is to provide a liquid rheostat in which the electrodes are stationary and the level of the electrolyte is variable.

Another object of the invention is the provision of a liquid rheostat having smooth stepless variation of resistance over the entire range of resistance.

A further object of the invention is to provide a liquid rheostat having no wearing parts.

A further object of our invention is the provision of improved cooling means for a liquid rheostat, to enable apparatus of a given capacity to be made smaller and simultaneously to minimize boiling, fuming, and the like, of the electrolyte.

A still further object of the invention is the provision, in a liquid rheostat having a floatable electrolyte tank, of means for preventing contamination of the electrolyte in the event the level of the liquid in which the tank is floating rises abnormally high and exceeds the height of the top of the tank.

Other objects will be apparent as the description of the invention proceeds.

In carrying out our invention in one form, we provide a tank for containing the electrolyte which is floated in a liquid having a variable level. A fixed support is provided above the liquid and from this support are suspended the electrodes in the electrolyte. As the level of the liquid rises, increased portions of the electrodes are submerged and the resistance of the liquid rheostat decreases. As the liquid level falls, the opposite occurs and the rheostat resistance is increased.

Figure 1:
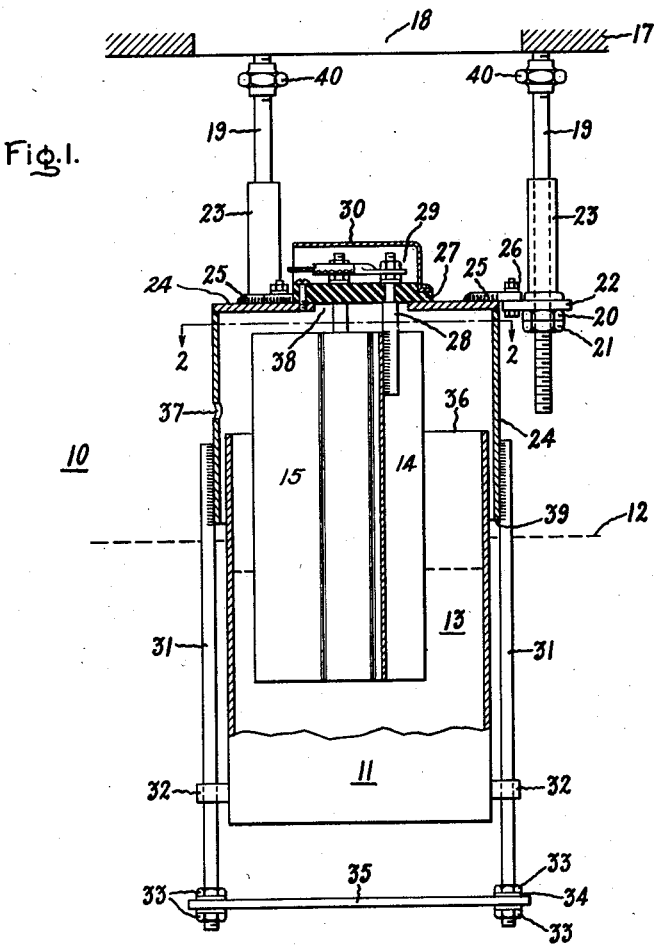
Figure 2:
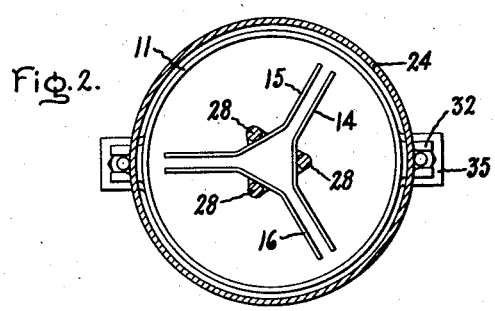

For a clearer and more complete understanding of the invention, reference should be had to the accompanying drawing in which Fig. 1 is an elevation view, partially in section, of a preferred embodiment of the invention; while Fig. 2 is a sectional view along the line 2—2 of Fig. 1.

In the drawing, our invention is illustrated embodied in a preferred form as a slip regulator for a three phase wound rotor induction motor. The liquid rheostat slip regulator is designated generally by the numeral 10. The rheostat 10 comprises a floatable tank 11 floating in a liquid 12 having a variable level. The tank 11 contains an electrolyte solution 13 in which are suspended three normally stationary electrodes 14, 15 and 16. The electrodes depend from fixed support means including a fixed member 17 which may be a portion of a tank containing the liquid 12. Portion 17 may be provided with an opening 18 above the liquid rheostat to provide easy access to the rheostat. Depending from portion 17 are a plurality of fixed vertical rod members 19 which are threaded on their lower ends. Each rod 19 is provided on the threaded portion with a nut 20 and a lock nut 21 for adjustably supporting the remainder of the fixed portion of the liquid rheostat. Each rod 19 is also provided with a horizontally projecting support member 22 which rests on nut 20, and a tubular guide member 23 positioned around the rod and attached to member 22 in a suitable manner. The function of guides 23 is explained in detail hereinafter.

The fixed portion of the liquid rheostat 10 includes a metal bell member 24 to which a plurality of projections 25 are attached in a suitable manner, such as by welding. The members 25 rest on the projections 22 and are secured thereto in a suitable manner, such as by nuts and bolts 26, thus supporting bell member 24.

The upper horizontal surface of bell member 24 is provided with an opening 38 which is closed by means of a flat member 27 of insulating material. Insulating member 27, in turn, is provided with three apertures through which extend three rods 28. The three electrodes 14, 15 and 16 are suspended respectively from these three rods, being attached to them in a suitable manner, such as by welding. Above insulating member 27, each rod 28 is provided with a terminal portion 29 which serves the dual purpose of supporting the rod and electrode attached thereto and of providing means for electrical connections to the electrode. If desired, a protective cover 30 may be provided over the terminals 29.

On opposite sides of the bell member 24 there are provided two guide rods 31 which are secured to the bell member 24 in a suitable manner, such as by welding. The tank 11 is provided with a pair of bosses 32 which are secured to the outside of the tank in operative relation with guide rods 31. Each of the bosses 32 has a slot through which the guide rod passes and, as the tank 11 moves up and down responsively to changes in the level of liquid 12, the guide rods 31 maintain tank 11 in alignment with bell member 24. At their lower extremities, guide rods 31 are provided with threaded portions and a plurality of nuts 33 and washers 34 on these threaded portions which secure a cross member 35. Member 35 provides a lower stop for tank 11 so that tank 11 cannot be lowered to such an extent that electrolyte 13 is entirely out of contact with electrodes 14, 15 and 16. This is a safety feature to provide protection in the event that the level of liquid 12 should become low enough otherwise to cause the electrodes completely to lose contact with the electrolyte.

In addition to the functions already described for bell member 24, it also provides means for preventing contamination of electrolyte 13 by liquid 12 in the event that the level of liquid 12 should rise abnormally high, and above the upper margin 36 of tank 11. Bell member 24, which is otherwise completely sealed above its lower margin 39, is provided with a vent 37 to permit the escape of air from the cavity formed by member 24, tank 11 and liquid 12 as the tank rises in response to an increase in the level of liquid 12. When the level of liquid 12 rises high enough to cover vent 37, this cavity, formed by the bell member, the electrolyte tank and liquid 12, is sealed and liquid 12 is prevented from entering the tank and contaminating electrolyte 13.

If the level of liquid 12 rises sufficiently, the upper margin 36 of tank 11 comes in contact with the under surface of the upper horizontal portion of bell 24. Then, if the level of liquid 12 rises still more, the buoyancy of tank 11 causes the entire bell and electrode assembly to rise along with the tank. In such a case, members 22 leave their supporting nuts 20, and the bell and electrode assembly and the tank are guided upward by guide members 23. If the level of liquid 12 continues to rise, this upward motion continues until members 23 contact the enlarged portions 40 on rods 19. If the level of liquid 12 then rises still further, the effect described in the preceding paragraph comes into play, and the air trapped in the cavity formed by bell 24 and tank 11 and sealed by liquid 12 still prevents contamination of the electrolyte 13.

If desired, the bell and electrolyte assembly may be supported at an intermediate position between the lower and upper extreme positions just described, in which case guide members 23 are at an intermediate position between nuts 20 and projections 40. The bell and electrode assembly may be so supported by means of a supporting cable (not shown) through opening 18, or in any other suitable manner, and such supporting means may be made remotely adjustable, if desired. By arranging the apparatus in this manner, the limits of operation of tank 11 may be changed accordingly, and this, in turn, may be used to maintain liquid 12 at various selected levels. The manner in which the present apparatus may be used as a liquid level regulator is described hereinafter.

It will be understood that the liquid rheostat illustrated in Figs. 1 and 2 is a three-phase rheostat, with the resistance for one phase being provided between electrodes 14 and 15, for another phase between electrodes 15 and 16, and for the third phase between electrodes 16 and 14, each of the electrodes being equidistant from the other two electrodes. The amount of resistance in each phase depends upon the extent to which the electrodes are submerged in the electrolyte, the greater the extent of submersion the smaller he resistance, and vice versa.

A preferred use for our invention is in a slip regulator for a wound rotor induction motor, and a liquid rheostat suitable for this purpose is illustrated in the drawing. The three electrodes 14, 15 and 16 may, for example, be connected through terminals 29 to the three phases of the secondary winding of a three-phase wound rotor motor. This motor may, if desired, drive a pump which controls the level of liquid 12.

In such a case, if the level of liquid 12 starts to rise, tank 11 rises, thus causing increased portions of electrodes 14, 15 and 16 to be immersed in electrolyte 13. This decreases the resistance between each pair of electrodes, thus decreasing the secondary resistance of the wound rotor induction motor and causing the motor to increase in speed. This increases the output of the pump controlling the level of liquid 12 and thus tends to decrease the level of liquid 12 until equilibrium is established. Thus, it will be readily understood that an automatic regulator is provided for the level of liquid 12.

Such liquid level regulators are widely used in many types of installations, such as sewage and water supply tanks, for example, in which it is necessary to maintain a substantially constant liquid level, and it is of great advantage to have a simple and reliable regulating system suitable for this purpose, such as our invention makes possible.

It can be seen that our invention provides a liquid rheostat having no wearing parts and requiring no heat exchangers, motors for raising and lowering electrodes, and other things which are necessary in conventional types of liquid rheostats. In addition, the presence of a liquid around the tank of electrolyte conducts heat away from the electrolyte rapidly and thus minimizes boiling, fuming, and the like, of the electrolyte.

While we have illustrated and described a preferred embodiment of our invention, many modifications thereof may be made by those skilled in the art. Therefore, it should be understood that we intend to cover by the appended claims any such modifications which fall within the true spirit and scope of our invention.

What we claim as new and desire to secure by Letters Patent of the United States is:

1. A liquid rheostat comprising a tank floatable in a liquid and arranged to rise and fall with the level of said liquid, an electrically conductive liquid in said tank forming an electrolyte and a plurality of electrodes fixed with respect to said liquid and suspended in said electrolyte.

2. A liquid rheostat comprising a tank floatable in a liquid and arranged to rise and fall with the level of said liquid, an electrically conductive liquid in said tank, a support above said liquid and fixed with respect thereto, a plurality of electrodes, and means suspending said electrodes from said support in said electrically conductive liquid in variable partially immersed relation therewith.

3. A three phase liquid rheostat comprising a tank floatable in a liquid and arranged to rise and fall with the level of said liquid, an electrically conductive liquid in said tank forming an electrolyte, and three fixed electrodes suspended in said electrolyte, each electrode being substantially equidistant from the other two, the resistance between each pair of electrodes through said electrolyte decreasing as the level of said liquid rises and increasing as said level falls.

4. A liquid rheostat comprising a tank floatable in a liquid and arranged to rise and fall with the level of said liquid, an electrically conductive liquid in said tank forming an electrolyte, fixed support means above said liquid, a plurality of vertically disposed electrodes suspended from said support means and partially immersed in said electrolyte, and a bell member depending from said support means and arranged to receive the upper portion of said tank, said upper portion rising up within said bell member when said liquid exceeds a predetermined level and forming a cavity sealed by said liquid, the air trapped in said cavity preventing said liquid from entering said tank and contaminating said electrolyte.

5. A liquid rheostat comprising a tank floatable in a liquid and arranged to rise and fall with the level of said liquid, an electrically conductive liquid in said tank forming an electrolyte, fixed support means above said tank, a bell member depending from said support means and arranged to receive the upper portion of said tank when the level of said liquid rises above a predetermined level, said bell member having an opening in the upper portion thereof, an insulating member closing said opening, said insulating member having a plurality of apertures, and a plurality of electrodes suspended in said electrolyte through said apertures.

6. A liquid rheostat comprising an open tank floatable in a liquid and arranged to rise and fall with the level of said liquid, said tank having a plurality of bosses on the side surfaces thereof, an electrically conductive liquid in said tank forming an electrolyte, support means above said tank fixed with respect to said liquid, a bell member depending from said support means and arranged to receive the upper portion of said tank, said upper portion rising up within said bell member as said liquid rises above a predetermined level, said bell member having an opening in the upper portion thereof, an insulating member closing said opening, said insulating member having a plurality of apertures, a plurality of electrically conductive rod members extending through said apertures, a plurality of vertically disposed electrodes suspended from the lower portions of said rods in spaced-apart relation in said electrolyte, a plurality of terminals on the upper portions of said rods above said insulating member for electrical connections to said electrodes, and a plurality of guide rods secured to the side surfaces of said bell member, said guide rods cooperating with the bosses on said tank to maintain said tank in alignment as it rises and falls with the level of said liquid.

7. A liquid rheostat comprising an open tank floatable in a liquid and arranged to rise and fall with the level of said liquid, an electrically conductive liquid in said tank forming an electrolyte, a fixed support above said liquid, yieldable height adjusting means connected to said fixed support, a bell member depending from said yieldable means and arranged to receive the upper portion of said tank, said bell member and said tank forming an air-tight cavity sealed by said liquid when the liquid rises to a predetermined level, and a plurality of electrodes insulated from said bell member and suspended therefrom in spaced-apart relation in said electrolyte, the upper portion of said tank rising up within said bell member as the level of said liquid rises until the upper margin of the tank contacts the inside upper surface of said bell member, said bell member being carried upward by said tank when said liquid level continues to rise and reaches a selected point above the point at which the upper margin of the tank contacts the bell member, the air trapped in said cavity preventing said liquid from entering the tank and contaminating the electrolyte if the level of the liquid exceeds the height of the upper margin of said tank.

8. A liquid rheostat comprising an open tank floatable in a liquid and arranged to rise and fall with the level of said liquid, said tank having a plurality of bosses on the side surfaces thereof, an electrically conductive liquid in said tank forming an electrolyte, a fixed support above said liquid, yieldable height adjusting means connected to said fixed support, a bell member depending from said yieldable means and arranged to receive the upper portion of said tank, said bell member and said tank forming an air-tight cavity sealed by said liquid when the liquid rises to a predetermined level, the upper portion of said tank rising up within said bell member as the level of said liquid rises until the upper margin of the tank contacts said bell member, said bell member being carried upward by said tank when said liquid level continues to rise and reaches a selected point above the point at which the tank contacts the bell member, the air trapped in said cavity preventing said liquid from entering the tank and contaminating the electrolyte if the level of the liquid exceeds the height of the upper margin of said tank, a plurality of electrodes insulated from said bell member and suspended therefrom in spaced-apart relation in said electrolyte, a plurality of guide rods secured to the side surfaces of said bell member, said guide rods cooperating with the bosses on said tank to maintain said tank in alignment as it rises and falls with the level of said liquid, and stop means connected to the lower extremities of said guide rods for preventing the tank from dropping sufficiently low in response to the lowering of said liquid level that the electrolyte loses contact with said electrodes.

9. A rheostat comprising a tank floatable in a liquid and arranged to rise and fall with the level of said liquid, said tank being adapted to contain an electrolyte solution, and at least one electrode normally stationary with respect to said liquid and suspended in said tank.

HENRY V. CRAWFORD.
LELAND J. PARKINSON.

REFERENCES CITED

The following references are of record in the file of this patent:

UNITED STATES PATENTS

| Number | Name | Date |
|---|---|---|
| 437,412 | Deprez | Sept. 30, 1890 |
| 1,157,134 | Welge | Oct. 19, 1915 |

FOREIGN PATENTS

| Number | Country | Date |
|---|---|---|
| 186,243 | France | Oct. 5, 1887 |
| 526,238 | Great Britain | Sept. 13, 1940 |